Figure 1:
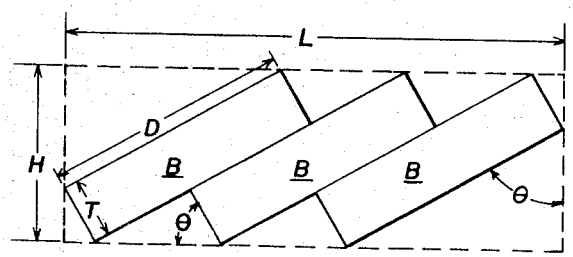
Figure 2:
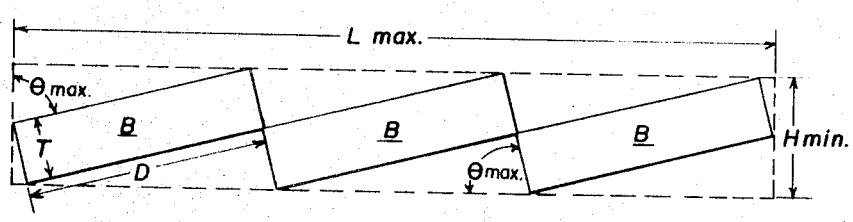
Figure 4:
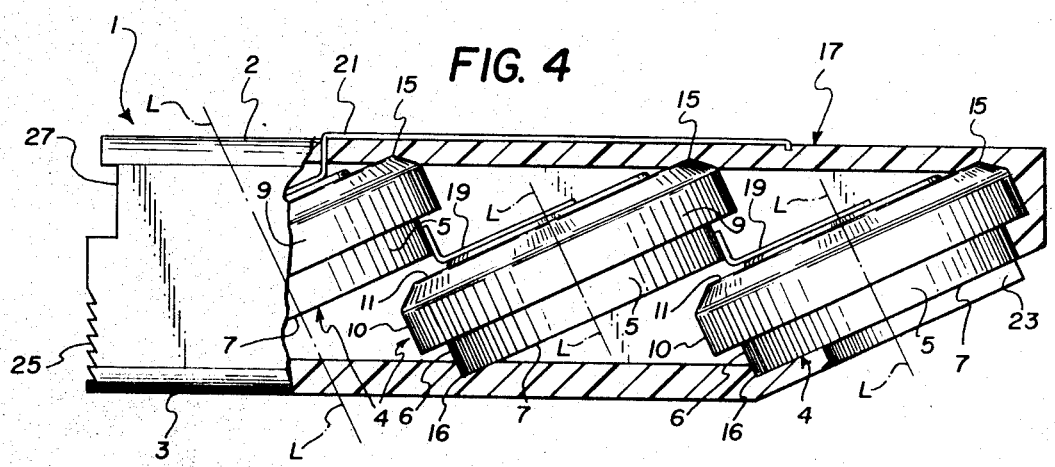
Figure 5:
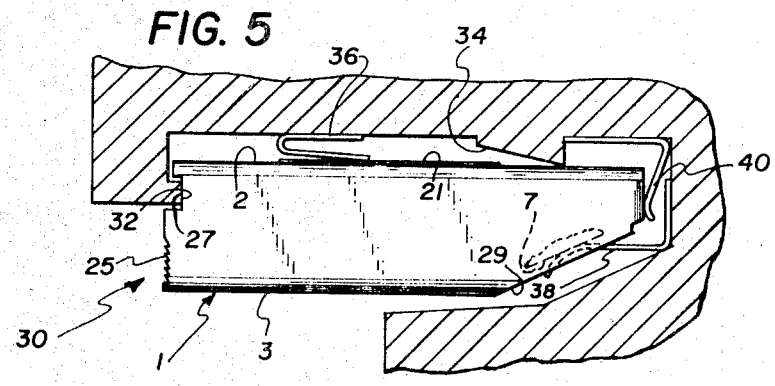
Figure 3:
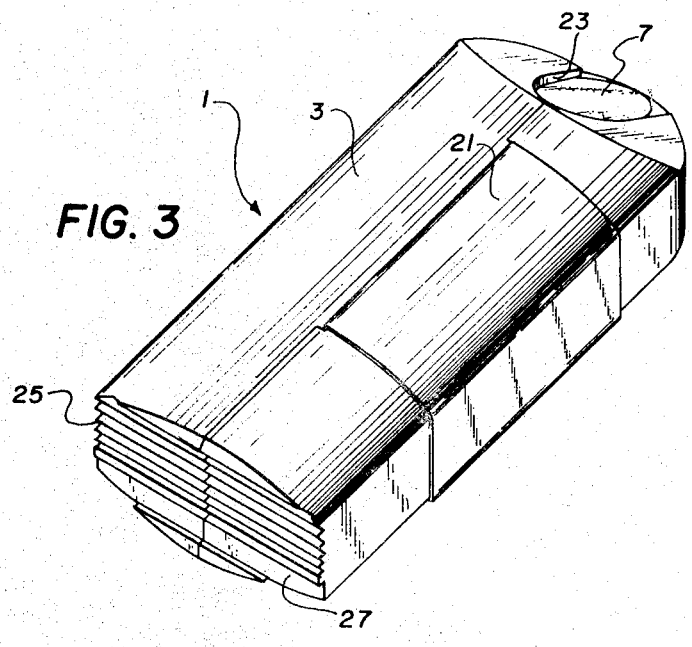

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 17

T896,007
BATTERY HOLDER

Jeffrey R. Stoneham and Benjamin B. Adams, both of 901 Elmgrove Road, Rochester, N.Y. 14650

Filed Sept. 30, 1970, Ser. No. 76,836
**Int. Cl. H01m *1/04***
U.S. Cl. 136—173
2 Sheets Drawing. 12 Pages Specification

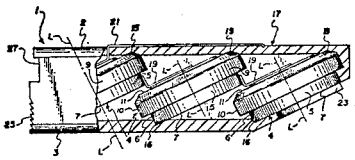

A holder for disc-like electrical batteries includes a set of support surfaces for engaging the side and end walls of a plurality of the batteries to position them in a shingled relationship.

BATTERY HOLDER

Filed Sept. 30, 1970 2 Sheets-Sheet 1

JEFFREY R. STONEHAM
BENJAMIN B. ADAMS
INVENTORS

BY D Peter Hoekberg
Robert W. Hampton

ATTORNEYS

BATTERY HOLDER

Filed Sept. 30, 1970 2 Sheets-Sheet 2

JEFFREY R. STONEHAM
BENJAMIN B. ADAMS
INVENTORS

BY D. Peter Hochberg
Robert W. Hampton

ATTORNEYS